US009117196B2

(12) United States Patent
Silas et al.

(10) Patent No.: US 9,117,196 B2
(45) Date of Patent: Aug. 25, 2015

(54) SYSTEM AND METHOD FOR RELEVANT BUSINESS NETWORKING BASED IN CONTROLLED RELEVANCY GROUPS, RESPONSIBILITES AND MEASURED PERFORMANCE

(75) Inventors: Gregory Robert Silas, Toronto (CA); Peter Anthony Grech, Toronto (CA)

(73) Assignee: BoardSeat Inc., Toronto, Ontario (CA)

( * ) Notice: Subject to any disclaimer, the term of this patent is extended or adjusted under 35 U.S.C. 154(b) by 287 days.

(21) Appl. No.: 13/572,256

(22) Filed: Aug. 10, 2012

(65) Prior Publication Data

US 2013/0041952 A1 Feb. 14, 2013

Related U.S. Application Data

(60) Provisional application No. 61/521,810, filed on Aug. 10, 2011.

(51) Int. Cl.
| | | |
|---|---|---|
| *G06F 15/16* | (2006.01) | |
| *G06Q 10/10* | (2012.01) | |
| *H04L 12/58* | (2006.01) | |
| *G06Q 50/00* | (2012.01) | |
| *G06Q 10/06* | (2012.01) | |
| *H04L 29/08* | (2006.01) | |

(52) U.S. Cl.
CPC ............... *G06Q 10/10* (2013.01); *G06Q 50/01* (2013.01); *H04L 51/32* (2013.01); *G06Q 10/063114* (2013.01); *H04L 67/306* (2013.01)

(58) Field of Classification Search
CPC ...... H04L 51/32; H04L 67/306; G06Q 50/01; G06Q 10/06114
USPC .......................................................... 709/217
See application file for complete search history.

(56) References Cited

U.S. PATENT DOCUMENTS

| | | | | |
|---|---|---|---|---|
| 5,754,938 A * | 5/1998 | Herz et al. | ..................... | 725/116 |
| 5,754,939 A * | 5/1998 | Herz et al. | ..................... | 455/3.04 |
| 5,835,087 A * | 11/1998 | Herz et al. | ..................... | 715/810 |
| 6,029,195 A * | 2/2000 | Herz | .............. | 725/116 |
| 6,460,036 B1 * | 10/2002 | Herz | .............. | 707/748 |
| 6,493,722 B1 * | 12/2002 | Daleen et al. | ........................ | 1/1 |
| 6,519,629 B2 * | 2/2003 | Harvey et al. | ................. | 709/204 |
| 6,988,127 B2 * | 1/2006 | Matsuda et al. | .............. | 709/204 |
| 7,069,308 B2 * | 6/2006 | Abrams | ........................ | 709/218 |
| 7,080,117 B2 * | 7/2006 | de Pinto et al. | ................. | 709/203 |
| 7,103,634 B1 * | 9/2006 | Ullmann et al. | .............. | 709/206 |
| 7,117,254 B2 * | 10/2006 | Lunt et al. | ..................... | 709/218 |
| 7,188,153 B2 * | 3/2007 | Lunt et al. | ..................... | 709/218 |
| 7,478,078 B2 * | 1/2009 | Lunt et al. | ..................... | 1/1 |
| 7,483,871 B2 * | 1/2009 | Herz | .................... | 1/1 |
| 7,752,081 B2 * | 7/2010 | Calabria | ...................... | 705/26.1 |
| 8,171,032 B2 * | 5/2012 | Herz | .............. | 707/748 |
| 8,209,746 B2 * | 6/2012 | Tamai et al. | ....................... | 726/6 |
| 8,346,864 B1 * | 1/2013 | Amidon et al. | ............... | 709/204 |
| 8,425,326 B2 * | 4/2013 | Chudley et al. | ................. | 463/42 |
| 8,429,090 B1 * | 4/2013 | Nielsen et al. | ................. | 705/319 |
| 8,621,215 B1 * | 12/2013 | Iyer | ............... | 713/169 |
| 8,738,543 B2 * | 5/2014 | Forbes et al. | ................. | 705/319 |
| 8,792,419 B2 * | 7/2014 | Wohlert et al. | ............... | 370/328 |
| 8,914,643 B2 * | 12/2014 | Isshiki | .......... | 713/182 |
| 2003/0037041 A1 * | 2/2003 | Hertz | ................. | 707/1 |
| 2003/0050977 A1 * | 3/2003 | Puthenkulam et al. | ........ | 709/204 |
| 2003/0233278 A1 * | 12/2003 | Marshall | .......................... | 705/14 |
| 2004/0267625 A1 * | 12/2004 | Feng et al. | ........................ | 705/26 |
| 2005/0021750 A1 * | 1/2005 | Abrams | ........................ | 709/225 |
| 2005/0193054 A1 * | 9/2005 | Wilson et al. | ................. | 709/200 |
| 2005/0210104 A1 * | 9/2005 | Torvinen | ....................... | 709/205 |
| 2005/0216300 A1 * | 9/2005 | Appelman et al. | ................. | 705/1 |
| 2005/0267766 A1 * | 12/2005 | Galbreath et al. | ................ | 705/1 |
| 2005/0267940 A1 * | 12/2005 | Galbreath et al. | ............ | 709/206 |
| 2006/0004789 A1 * | 1/2006 | Lunt et al. | ..................... | 707/100 |
| 2006/0053380 A1 * | 3/2006 | Spataro et al. | ................ | 715/753 |
| 2006/0143068 A1 * | 6/2006 | Calabria | ......................... | 705/10 |
| 2006/0209727 A1 * | 9/2006 | Jennings et al. | .............. | 370/260 |
| 2008/0098313 A1 | 4/2008 | Pollack | | |
| 2008/0294584 A1 * | 11/2008 | Herz | ................. | 706/46 |
| 2009/0013386 A1 * | 1/2009 | Puthenkulam et al. | ........... | 726/4 |
| 2009/0106040 A1 * | 4/2009 | Jones | ................. | 705/1 |
| 2009/0222278 A1 * | 9/2009 | Reinders et al. | ................... | 705/1 |
| 2009/0234878 A1 * | 9/2009 | Herz et al. | ..................... | 707/102 |
| 2010/0027527 A1 * | 2/2010 | Higgins et al. | ................ | 370/351 |
| 2010/0082695 A1 * | 4/2010 | Hardt | ............................ | 707/798 |
| 2010/0131327 A1 * | 5/2010 | Hseush et al. | .................... | 705/9 |
| 2010/0174911 A1 * | 7/2010 | Isshiki | .......... | 713/182 |

(Continued)

OTHER PUBLICATIONS

EPO, Extended European Search Report relating to Application No. 12821549.8, dated Feb. 20, 2015.
CIPO, CA Office Action relating to Application No. 2,844,801, dated Jun. 3, 2015.

*Primary Examiner* — Viet Vu
*Assistant Examiner* — Michael A Chambers
(74) *Attorney, Agent, or Firm* — Rowand LLP

(57) ABSTRACT

A business networking system and method for groups of people within a variety of business types to organize themselves into specific and relevant categories in order to maximize the exchange of relevant information and further development of relevant business contacts. The method and system offer tools for registering members and sub-dividing those registered members into smaller relevant groups. The method matches members of similar backgrounds and business experiences and provides communications, messaging and meetings for relevant. The system provides tools to encourage reciprocal relevant communications, both online and in the real world, between members. All activity is tracked and grouped into a plurality of statistics that are then ranked and shared with members. The statistics are used by the TBS system as a scorecard or as punishment in the form of expulsion from the categorized group.

20 Claims, No Drawings

(56) References Cited

U.S. PATENT DOCUMENTS

| | | |
|---|---|---|
| 2010/0205179 A1 | 8/2010 | Carson et al. |
| 2010/0241611 A1* | 9/2010 | Zuber .......................... 707/608 |
| 2010/0241971 A1* | 9/2010 | Zuber .......................... 715/753 |
| 2011/0035264 A1* | 2/2011 | Zaloom ...................... 705/14.12 |
| 2011/0066506 A1* | 3/2011 | Sung et al. ................. 705/14.66 |
| 2011/0138003 A1* | 6/2011 | Yoon et al. .................... 709/206 |
| 2011/0202981 A1* | 8/2011 | Tamai et al. ....................... 726/6 |
| 2011/0249658 A1* | 10/2011 | Wohlert et al. ................ 370/338 |
| 2011/0314017 A1* | 12/2011 | Yariv et al. .................... 707/737 |
| 2011/0320373 A1* | 12/2011 | Lee et al. ....................... 705/319 |
| 2012/0192258 A1* | 7/2012 | Spencer et al. .................... 726/7 |
| 2012/0226544 A1* | 9/2012 | Merrifield .................. 705/14.27 |
| 2012/0265814 A1* | 10/2012 | Roussis ......................... 709/204 |
| 2012/0324018 A1* | 12/2012 | Metcalf et al. ................ 709/206 |
| 2012/0331052 A1* | 12/2012 | Rathod ......................... 709/204 |
| 2013/0326368 A1* | 12/2013 | Voas et al. ..................... 715/753 |

\* cited by examiner

SYSTEM AND METHOD FOR RELEVANT BUSINESS NETWORKING BASED IN CONTROLLED RELEVANCY GROUPS, RESPONSIBILITES AND MEASURED PERFORMANCE

CROSS REFERENCE TO RELATED APPLICATION

This application claims priority upon U.S. provisional Patent Application No. 61/521,810, filed Aug. 10, 2011 the whole of which is incorporated herein by reference.

FIELD OF THE INVENTION

The present invention relates to the field of systematized networking and particularly business networking operating upon and by internet connections between registered users and members.

BACKGROUND OF THE INVENTION

Social networking has become a phenomena of late which is keyed into the ubiquitous nature of the internet, the low cost and free availability of computers to almost everyone and the multiplicity of types of connections in wide use. Users establish an account and basically have complete access to information posted by others. Attempts have been made to restrict the amount and relevancy of available information in such contexts by limiting access to approved 'friends' (Facebook™ ). Social expansion is geared upon simple involvement and a growing list of approved contacts. Undoubtedly such systems achieve the objective of social expansion driven by simple involvement. In some, activity is limited by a sign on process wherein a user must explore individual pages or walls where others post information to be disseminated. The result is a huge accumulation of random social information which may or may not be useful in any context, especially any business context.

One attempt to restrict the free flow of random social information is shown in US pending patent application 2011/0,138,298 to Alfred Joseph, published Jun. 9, 2011, in which a social networking site seeks to prevent unwanted or inappropriate user content. This is done by restricting the posting of new information by 3rd party users in accordance with a subject-user profile and consent.

In another, U.S. pending patent application 2011/0,137, 932 published Jun. 9, 2011 to Wable, the applicant seeks to enhance the relevancy of search results by restricting the search response based upon information about the user retained by the system. The applicant discusses background as follows:

Social networking systems allow users to designate other users as friends (or otherwise connect to or form relationships with other users), contribute and interact with media items, use applications, join groups, list and confirm attendance at events, create pages, and perform other tasks that facilitate social interaction. Social networking systems are a good example of the demand for systems that help users locate relevant information from within a large set of information tracked or otherwise used by the system.

Although it might be helpful to customize a search for a user's particular needs, many systems have little or no relevant information about the user who is searching for information, which makes locating information of particular relevance to a given user more challenging. But a social networking system typically tracks a considerable amount of information about each user, which can be leveraged to identify items of relevance to a given user. However, the query functionalities currently available on social networking systems do not fully leverage the information that the systems store. Nor do other systems use the information stored by social networking systems to improve the relevance of the data provided to their own users.

Yet another is depicted in US pending patent application 2011/0,137,844 published Jun. 9, 2011 to Miranda. In this application an attempt is made to increase relevancy by the use of 'virtual cities' which appear to be pre-allocated levels of expertise and knowledge in any particular field which then can be accessed by the user seeking relevant assistance. That system seeks to recognize the accomplishments of experts and memorialize these accomplishments. The applicant states:

A virtual technical networking architecture is disclosed that allows a user to locate resources, seek expertise and collaborate with identified experts located within a virtual city in order to mentor, teach and resolve problems or fill a need. The virtual city offers a gaming technology environment to users, wherein the experts are depicted as avatars within the virtual city and different levels of expertise and different affiliations or professions are identified by different avatar accessories. The virtual city allows for the knowledge management of a wide variety of sources categorized into common areas of interest. Thus, the virtual city connects people and transfers knowledge remotely in an on-demand environment. Accordingly, an entire virtual city of experts in a wide variety of fields can be built, that brings large groups of people and resources together for intellectual capital and knowledge management. The virtual city can then be used to educate, train and disseminate information, and can be specifically applied in an educational or career training environment.

Still another is shown in U.S. pending patent application 2011/0,093,506 published Apr. 21, 2011 to Lunt. In Lunt the relevance of a search result is sought to be enhanced by restricting the initial results based upon degrees of separation. Lunt states:

DESCRIPTION OF THE RELATED ART

A key metric in evaluating the performance of search engines is relevance of the search results. Search engine developers are always striving to deliver search results that are relevant to the search query being processed. Consistent with this goal, there have been attempts to rank search results based on a number of different factors. One of the more popular ways to rank search results involves analyzing the location and frequency of keywords on a web page. Another frequently used technique is analyzing how web pages link to each other. A web page gets a ranking boost based on the number of other web pages that are linked to it. Click-through rates of search results are analyzed in some search engines. The general rule is: the higher the click-through rate, the higher the ranking.

The invention provides still another technique to improve the relevance of search results. According to an embodiment of the invention, search results, including sponsored links and algorithmic search results, are generated in response to a query, and are ranked based on the frequency of clicks on the search results by members of social network who are within a predetermined degree of separation from the member who submitted the query. The predetermined degree of separation is equal to one if the click activities of only the friends of the member who submitted the query are to be examined.

In US pending patent application 2011/0,055,725 published Mar. 3, 2011 to Folgner a system is shown which seeks to enhance relevancy of search results by a system of first and second attributes between users and search frequency resulting in user recommendations by venue or purpose.

In U.S. Pat. No. 7,895,177 issued Feb. 22, 2011 to Wu the relevance of results from a free form search is described as increased as the query is modified using the user's profile, social network and/or location and the results presented back to the user along with aggregated ratings of calculated relevance.

In U.S. Pat. No. 7,761,383 issued Jun. 20, 2010 to Jaipuria yet another effort to increase relevancy and optimize networking capability is shown. Discussion of the use of both social and business networking is outlined. In this disclosure individual users register themselves and then grants peers a specific level of access to each individual. The system seeks to provide a multibridge linking code which allows access to information regarding other users.

The levels of access give the user an opportunity to control the amount of personal information, including contacts that they make, available to their individual peers. Based on the level of access granted by the user, the peer may or may not be able to access the user's information or the user's personal databases for potential networking. The level of access granted by two individuals need not be the same for each other.

In U.S. Pat. No. 6,175,831 issued Jan. 16, 2001, to Weinrich the original networking database is built solely upon confirmed individual relationships in a process started by individual users.

In yet another example the social networking model is sought to be enhanced by providing location specific communications between users signed on as described in US published pending application 201 0031 31 42 by Brown, David published Dec. 9, 2010. IP addresses are uses to provide a location specific facility which increases availability between users signed on in nearby locations.

In still another user information is validated by the system as in US pending application 20100100937 to Tran, Truong published Apr. 22, 2010. In that method input business information is automatically validated so as to increase relevance to other users.

The social networking model has been expanded to business and professional activity. The results of these early efforts can be an overwhelming volume of irrelevant information and requests for contact which detract greatly from any specific business purpose. Essentially a searchable database is provided with keywords such as user profile, specialty or interest.

OBJECTS OF THE INVENTION

The objective of the invention (herein the TBS system) is to create a computer based system and method that automatically fosters relevant business networking between its categorized members using online interaction and face to face meetings. TBS acts as both the continuity of and the catalyst for these fostered interactions. The online portion acts as the continuity between face to face meetings. Such regular online communications allow face to face meetings to be more productive as inhibitions are reduced, trust is built and knowledge of each participant is vastly increased in advance of meetings. The resulting more productive face to face meetings are of greater value. This value translates into meaningful and relevant business connections between people that use the TBS system and method for advertising, solving corporate problems, asking personal advice, managing their business goals & lifestyle choices and obtaining relevant information for any other form of decision making.

It is an object of the TBS system and method to manage relevant, member-driven information and promote networking via industry and function-specific societies. The TBS system and method operates as a computer based middleman for business networking and a facilitator of relevant information and introductions.

Another principal objective is to improve upon the utility of both online social networking sites and face to face networking groups whereby networking is enhanced in a business context (business networking).

A still further objective of the present invention is to provide multiple online responsibilities to particularly grouped users.

The use of responsibilities is not common in the prior art. Moreover, It is a further object to provide unique combinations of responsibilities not found in any website or real life networking group.

It is another object of the invention to provide a system and method designed as a revenue model, not a "build and they will come" standard internet approach.

SUMMARY OF THE INVENTION

The present invention provides a method of automated business networking between individuals including establishing and maintaining a remotely accessible database structure regarding individual members of a business networking group including data elements for member categories and member business functions, wherein the database structure includes hierarchical data elements for member categories and member business functions; collecting and storing data in the database regarding individual members of said business networking group including individual data elements for member category and member business function, wherein the collection and storage of data includes identification of hierarchical category data elements and business function data elements for individual members; presentation of lists of members restricted to specified levels of hierarchical category data elements or hierarchical business function data elements; providing for networking events between members on the lists; tracking networking events between and among particular members as inter-member activity; and accumulating data records of each inter-member activity and providing records to particular members.

The present invention also provides a networking method wherein specified levels include only those members at specified hierarchical levels.

The present invention also provides a networking method which includes identification of potential colleagues for any member from the lists based upon specific identification or by said category or function, for invitations between members to become colleagues of each other, for acceptance of any colleague invitation, for identification of accepted invitations as colleagues for individual members, and for accumulating data records of each said colleague and providing said records to said colleagues.

The present invention also provides a minimum inter-member activity level between colleagues.

Further, the present invention provides the above method and system along with providing for a plurality of societies of members, providing specifications for entry into named societies, providing for creation of a named society by a first member which named society includes criteria for entry into said named society, providing for invitations between members of a named society and non-members of that society to enter the respective named society, providing for acceptance of a society invitation if specifications and criteria are met by said non-member, identification of accepted society invitations as society members, accumulating data records of inter-member activity in respect of each said society as intra-society activity.

The present invention also provides a computer and internet driven system and method including data structures maintained on computer information servers whereby users may engage in computing device operated automated business networking which includes a series of built in user TBS Responsibilities for entry into and continuation of the system and method as:

a. to become members:

1. TBS users are be organized by broad categories based on income and geography.

2. TBS users complete their entire user profile as this aids users to effectively match up with each through this knowledge-base. Failure to complete all required fields will result in a user's restricted use of the system and method in a preferred manner by an inability to join a Society and inability to search for societies or members.

b. TBS members are part of at least 1 TBS society: industry-based or function-based, in groupings of minimum 20 people, maximum 25 people, and under specific, target time lines. Failure to be part of a society results in the restriction of a member's ability to create new societies, join specialty societies or communicate with any society member.

c. TBS society members populate their societies within a specific time frame and failure of that step in the method causes the society to be disbanded.

The present invention, TBS, provides simple motivating techniques for society members to interact online and in face to face meetings. This is accomplished by 3 methods:

1. Mandatory Communications Activity by a Point-Rating System:

Every type of communication, whether online or face to face, earns a specific amount of points.

A minimum number of monthly points must be earned, failure of which will result in expulsion from the Society as it means the member was not adding value to the networking of the group.

Second, these points, as well as many other member statistics, are viewable by all TBS members thus creating a status symbol, competition and fear of non-performance, all as motivating tools.

2. Assistance by Suggestions at Every Turn:

Communication between members is broken down into numerous categories to aid users in distinguishing types of relevant information and to help them brainstorm for specific types of ideas, questions or news. In each category, text boxes have content that ask users questions.

3. Achievement Recognition by Ascension to the Board:

The ultimate online achievement is to be asked by TBS to sit on the Board of Directors of a Society. To achieve this, a member must acquire a set minimum number of points over a given time period. An internal TBS algorithm then determines which members are invited to be a board member and an invitation is sent out. This is both meant as a status symbol/recognition, and a method to give back to society members in a mentoring capacity.

In one embodiment of the present invention, TBS, provides for specific Member's Responsibilities a. Society members search for the best possible matches for filing their societies. Members read and review the profiles of other members before deciding on a nomination to a Society.

b. Once one or more members are nominated to a Society, they must accept or decline. If they accept, they are required to join that society should the vote pass. Failure to join results in expulsion from TBS.

c. Society members then review all nominations and vote on which users will bring the most value to their Society. This is peer to peer reviewing. For a vote to pass, it requires a 67% quorum and a 67% positive vote of that quorum.

d. Organizing themselves into small, coherent and relevant grouping by voting each other into categorized groups ("Societies")

e. Users will be required to make certain commitments to people, and groups of people, who will expect those actions to be reciprocated.

User responsibility is a key element in the present invention which provides a small but expansible usage of the system and method of the invention based upon actual networking results in a peer-to-peer review process. User societies are formed at a functional level and are only carried forward by actual networking results.

THE PREFERRED EMBODIMENTS

The preferred embodiment of the invention provides a information database for members which is available on the internet as a website and which provides for networking, communications and interactions between registered members (herein also 'users') in accordance with the preferred embodiments.

The first component of the preferred embodiment is a series of account pages which are configurable by the member to set manner and type of communications.

Messaging Notification Settings Page: TBS security settings are managed by each user and they can adjust the notification configuration as they wish. The result is that they may receive as little as the TBS' weekly summary report, or, as much as a notification for all kinds of communications sent to them by TBS members.

Colleagues Settings Page

Accept Colleague Requests from: The user sets permissions as to who can send a Colleague request. Default settings are all TBS members. An alternative embodiment includes configuration settings for levels with functions such as Management and Staff. For each grouping of the following choices the system checks the database and match against user's Profile information: (1) Do not accept Colleague Requests, (2) Accept requests only if in the same Function, (3) Accept requests only if in the same Industry (based on NAICS level 2), (4) Accept requests from any Mutual Colleague (COAC), (5) Accept all requests (all executive TBS members—checkbox is defaulted to this choice).

My Updates: Set permissions as to who can view user update changes (change in Title, Employer or Employment status): (1) My Colleagues, (2) Colleague of a Colleague—COAC: 1 degree of separation—, (3) My Society Members, (4) No one.

Audit Trail Page: Shows history of every change a member's PA made on all their pages (see Audit Trail in Personal Aide section). Each line in the table represents an action, whether "completed" or "abandoned" and whether or not part of the same login session. Column headers include: (1) PA's name (as there is more than 1 PA that can affect a member's account, first column contains the name of that PA), (2) Login Date, (3) Start Time, (4) End Time, (5), Duration, (6) Action Initiated (all website functionality is broken into a list of possible actions. System must chose from this list), (7) Outcome (completed vs. abandoned), ">" symbol (if clicked on, brings user to that Action).

Security Settings Page: Contains Password, session time-out and security question configuration.

Administrative Settings Page: Contains Billing Options, Disable Accounts & Cancel Membership functionality.

Help Page: Clicking HELP from footer links results in a right-column pop-up, this area has full central column Help. However, in Account, HELP results in a full centre column page. Either way, there are 4 ways to search:

The second component of the preferred embodiment is a series of Colleagues pages which list a member's Colleagues, provide for maintenance of the member's Colleagues list, provide for communications and meetings between Colleagues and monitor usage and a member's networking activity and success.

Colleagues: A list of Colleagues is maintained for each member which is an aggregation of known members.

Adding Colleagues: The only method to add a member as a colleague is from that member's Profile page: clicking on +Colleague. A TBS auto-generated message is sent out to the member asking if they would like to ACCEPT or DECLINE the invitation to be the sending member's Colleague. Clicking ACCEPT results in the requesting member received an auto-generated message from TBS informing them that <name> member has accepted their Colleague request. This also results in an auto-generated news post to all of both of their set of Colleagues under Status Updates informing all colleagues of the new Colleague connection.

Minimum Communication Requirement (Minimum Time to Reach Out): (1) Min 1 point/6 months: TBS requires a minimum of 1 point (1 message or 1 meeting) between each of one's Colleagues every 6 months, otherwise that Colleague will be automatically deleted. There are 2 warning messages prior to deletion. If members become Colleagues anytime during the month (1st day, 5th day, 17th day, etc), it is assumed they became Colleagues on the LAST day of the month thus making it easier to group everyone together each month. (2) Rolling 6-Month Cycle: At the beginning of each month, the system checks to see which of your Colleagues you have not spoken to in 5 months or more and warning Messages are send at various time s to inform the member of upcoming Colleague deletions if at least 1 messages is not reciprocated between the 2 members. (3) The date on which people became Colleagues is tracked. This information will is used both to track the minimum 1-point per 6-month requirement and to let member's know how long they have known their Colleagues.

COAC (Colleague of a Colleague): TBS allows 2 degrees of separation: (1) Limited Access to COAC: A member can see the list of Colleagues of his Colleagues, but no further, (2) Messaging a COAC: A member cannot use Colleagues to communicate with that 2nd degree. In order to message someone on TBS who is not your Colleague yet (Non-Associated), the user goes to that member's Profile page and click "+Message Member". A user can access that member's Profile page from either the Member Search results, or by clicking on their name anywhere a user finds the name on TBS.

A member has 2 choices to add a Colleague: (1) Perform a search. Find a member. Click on their name to get their profile. As long as that member has configured their Colleague function to permit Colleague requests, then click on the button called "Add Colleague", (2) Go through COAC. Look at your Colleague's list of Colleagues. If you see someone you would like to add, either click on their name to get their Profile page, or, click on the button beside their name on that COAC page called +Colleague.

To Message an existing Colleague, a member has 5 choices: (1) From a member's Colleagues Page, click +Message or +Meeting from within the ACTIONS drop-down menu choices, (2) From the member's Profile page, click +Message or +Meeting, (3) From the COAC page: click on one of their Colleagues and to bring up that person's Profile page. From there, click on "View Member's Colleagues". Then choose from the list the COAC you wish to contact and click on Message or Meeting, (4) Using the +Message or +Meeting button in right column, (5) Using the drop-down text box, central column, in News Posts.

ACTIONS drop-down menu (located beside each Colleague's name) housing the following options: (1) Message a Colleague, (2) send a meeting request to a Colleague, (3) Delete a Colleague, (4) Never Accept Posts from this member 2 kinds of pop-ups: (1) Hover-over: any thumbnails which have no info (no name, title, employer) will results in a hover-over tooltip over that small thumbnail giving that info, (2) Pop-up box: Clicking on "Societies in Common" (SiC) or "Mutual Colleagues" links which are located below the small thumbnails will result in a pop-up box giving the full list of Societies or Mutual Colleagues with all relevant info.

Layout of Colleague Pages: There are 3 tabs under Colleagues: (1) Requests & Activity: Default tab when arriving at Colleagues pages. It has 2 sections: (a) Colleague Requests (section): Top section of central column is list of all outstanding Colleague Requests, and (b) Recent Activity (section): Below Colleague Requests on the main Colleagues page, show all recent activity (last 30 days) showing breakdown of newly added & departed Colleagues, Colleagues no longer in a member's society, a Colleague that changed job title, and a Colleague that changed employer. Difference between Recent Activity and News Posts: In Colleague pages (Recent Activity), a member sees the above changes (a) to (e) to ALL of their Colleagues, whereas in News Posts, a member only sees (d) and (e) and only concerning their co-Society members. Regardless of Recent Activity or News Posts, all updates are system-generated notifications. (2) My Colleagues: A member can view the List of Colleagues 2 ways by clicking the appropriate small icon in top left area beside "Search Colleagues" box: List View (vertical column) and Thumbnail View (across the page and down in checkerboard format). List View page also provides 2 functions: (a) Search: Above the List of one's Colleagues but below Colleague Requests, is a search feature allowing a user to quickly access any of their Colleagues by typing in a minimum of 2 characters which would begin to pre-populate a list of Colleague's that match those 2 characters. A member can perform a search of their Colleagues by one of several methods: Name, City, Employer, University, and (b) Sort: Located beside Colleague Search is the "Sort By:" function which allows a user to sort his/her Colleagues by one of several methods: First name, Last Name, Employer, Time Remaining (default), Societies in Common (Lists Colleagues in order of a member's Societies in Common), (3) 3. Manage Your Lists: Allows members to create their own lists of Colleagues, modify or delete the lists.

Creating Lists: There are 3 ways to create a new list: (1) Manually: See "Adding Colleagues" above. Note that there is no syncing or conflict issues with "Entire List" method because they are not presented on the same page. (2) Choose from Entire List: "Choose from Entire List" above. (3) Generate from TBS Database: Member's can choose from 6 different drop-down menus which choices may be combined: Country, City, Employer, Society, Industry (based on NAICS level 2), Function. Once the choices are made and GENERATE button is clicked, results from the search is presented. Then it is the same process as "Creating Lists" above above (tick checkboxes). A Colleague may be part of as many lists as a member wants, however, if a Colleague is deleted, then they are also deleted from all lists and groupings within Colleagues. TBS automatically generates a minimum of 7 lists for each member based on existing database information: Employer, Industry (NAISC Level 2), University, Function, Friends, Work/Business, TBS Networking. In addition, as soon as the member joins a Society, that entire society and anyone that subsequently joins it, is added as a preset list. The name of that society is automatically added as the name of the list.

Receiving a Colleague Request is not a message and thus does not generate a message anywhere. Only in Colleagues page does it appear as "(name) has sent you a Colleague Request". Accept/Decline button: Once accepted, all of their Colleagues receive a post in News Posts under Status Updates as to which members are now connected as Colleagues. Note that Declining a Colleague Request does nothing: no message is generated and the Convener of the request is not notified of the declined outcome. TBS tracks which member are sending out how many Colleague requests and how many of those requests are being accepted vs. Declined. Confirmation Message: Once a member has Accepted a Colleague request, an auto-generated message is sent back to the requester saying: " . . . (name) . . . has accepted your Colleague request". All of the requester's existing Colleagues will receive the following message on their News Post. Meaning, the requesting member and the accepting member do not receive this message (category: Status Update).

Joining a Society: Every time a user joins a Society, all Society members are automatically put into that user' Colleagues and they receive a TBS message saying "You joined this Society. All members have been added to your list of Colleagues." For every additional Society member added, existing Society members get a similar message saying "Has joined (name) Society and has been added to your list of Colleagues." When a member leaves a Society (resigns, voted out, pulled out due to Shuffle), TBS auto-generates a message saying "You have just left (name)Society. Review your list of Colleagues if you prefer to delete these members." The remaining members of the society where a member just left also receive an auto-generated message from TBS saying "Has left [name of society]. Review your list of Colleagues if you prefer to delete this member.

Categorization of Colleagues: When accepting a Colleague Request, a choice is present via checkboxes. Member can choose more than 1 option, but must choose at least 1 of the options. Note that this is not the same as "Lists" which are optional lists of Colleagues that each member creates from their database of Colleagues. Both part of the same choice of "Lists" drop-down menu in Colleagues page. For example, a user's boss may want all subordinate staff to be on a work-related list. A user may have colleagues met on TBS or simply friends known in the business world. All Colleagues are entered into at least 3 major categories: (1) Friends, (2) Work/Business, (3) TBS Networking.

+Colleague Button: Once a member has sent a Colleague Request to another member, the +Colleague button on that other member's Profile page is not visible. There are 3 states: (1) Request Sent: 1 request is already sent and thus a second one is not necessary. Until the responding member actually Accepts or Declines the request, the +Colleague button should change to "Colleague Request Pending", (2) Request Accepted: The member is now a Colleague, (3) Request Declined: The responding member declines the Colleague request. The responding member who Declined the request can always send a request back to the originating member.

TBS includes a Content Management System (CMS) to manage content (website items like photos, help texts, etc) and user's account content. See Personal Aide for detailed & required functionality. In addition to Personal Aide requirements, CMS establishes various levels of access for system supervisors and monitors, particularly for Person Aides.

Face to Face (F2F) & Meeting Requests

Creating a Meeting Requests: Face to Face (Face2Face or F2F) meetings is the 2nd important aspect of the preferred embodiment, the other is online communications (e.g. News Posts, Messages, Lifestyle threads, etc). F2F pages are not updated with information records until an actual meeting has been set up.

Initiate a Meeting Request (4 methods) but all requiring same information: (1) +Meeting: Button located in the right, (2) +Meeting with Member: Button located on all member's Profile pages, (3) +Society Meeting: Button located on each of a member's society's pages at the top of centre column, (4) Meeting Request: Link located atop of the centre column in Message Centre.

Information Fields: The following information is required for all 4 methods: Recipients, Date, Time, Type of meeting (virtual or F2F), Video conferencing software (if applicable), Address for meeting, Style of meeting (general cocktail vs roundtable, Message—Topic, Message—body. Once a Meeting Request is sent, it ends up in a member's Message Centre. If the member clicks on ACCEPT, a meeting is created.

Minimum # of Attendees: In order to be considered a meeting and thus a meeting record created, a meeting must have at least 2 attendees, of which the Convener is considered 1 of the attendees.

F2F Page Layout (4 Tabs)

Upcoming Meetings (tab 1): As soon as a Message Request is sent, a message record is created in the meeting Convener's F2F page under the "My Originated Meetings" tab. The meeting only shows up in the Convener's "Upcoming Meetings" tab when at least 1 attendee has clicked Accepted in the Meeting Request message. Similarly, the record is only created in the attendee's "Upcoming Meetings" once he has Accepted. The tab "My Originated Meetings" is simply the list of all meeting requests a member has initiated.

Member Tooltip & Pop-Up Boxes: Moving the cursor over another member's name or thumbnail results in a hover-over pop-up box with that includes Larger thumbnail of member, Name, Title, Employer, # of Mutual Colleagues, # of Mutual Societies.

Drop-Down Menu Options Include Reply, Reply All, Unable to Attend, Verify Attendance.

Removing Meeting Records: Meeting records in Upcoming Meetings are automatically removed. They cannot be removed manually by a member. The meeting record is removed one of two ways: (1) Cancel: if the meeting is cancelled by the originating members, or (2) Date: If the date of the meeting has passed, the record is removed from Upcoming Meetings only once attendance verification process has been performed. Then it is put into Meetings History.

Calendar: A calendar widget is included to visually see all Upcoming Meetings in F2F. Hover-over the entries on this calendar will result in a large pop-up box showing complete meeting details. From that pop-up, another link is available to see the Agenda, attendees, and other details.

Attendance Verification: Both attendance and verification is required to earn points. Both the meeting convener and the attendees must confirm attendance. System verifies whether or not Convener's confirmation of each attending member matches the answer from that member. If match occurs, points are awarded.

My Originated Meetings (tab 2): This tab serves as a summary of all planned (originated) meetings set up by a member and is available only to that member, regardless if anyone has accepted the meeting request yet.

Meeting Records: These record items contain all the same information that was inputted when the originating member created the meeting (same information available in "Upcoming Meetings"). Threading does not occur in My Originated Meetings but rather in Upcoming Meetings. Also, there is no "collapsed view", all meeting record items are fully expanded to show all text.

Drop-Down Menu Options Include Reply All, Modify Meeting, Cancel Meeting, Verify Attendance.

Notes: Message Attendees from My Originated Meetings: Any message sent from My Originated Meetings tab is a message that is added to the original message (Meeting Request) Inbox and thus added to the thread. Message for Modifying Message Details: When any detail of a meeting is modified by the convener, once Update is clicked, TBS autogenerates a message to all Invitees, including those who Declined because they may now be able to attend. This new message acts as a REPLY and added to the original meeting-message thread in one's Inbox. The original message would also dynamically change meeting details and those changes would be in RED. The message category would also change: called "Modified Meeting" which is still grey, but bold-faced. If not one has yet responded to a Meeting Request, then a meeting record in Upcoming Meetings has not yet been generated. If the Convener then clicks on Reply All in My Originated Meetings, it is nonetheless added to a different message thread such that as soon as someone Accepts the Meeting Request, then the meeting record generated in Upcoming Meetings contains the original message (all meeting info) AS WELL AS the 1st message in the thread which also came from the Convener.

Removing Meeting Records: Each meeting record is removed from My Originated Meetings in one of several ways:

Cancel Meeting: if the meeting is cancelled via drop-down menu selection, or

Date: If the date of the meeting has passed, the record is eliminated from Upcoming Meetings. However, it is not removed from My Originated Meetings until the originating member has performed the attendance verification process. Once that is complete, record is removed and moved to Meetings History.

Agenda: Agenda simplifies and structures F2F meetings. Agenda is a wiki providing that any attending member can update it, and changes are visible. All PAs that are linked to any executive who are part of that meeting can view the agenda with the same access as their associated execs. Agenda has a timeline so if total meeting time is set at 2 hours, individual agenda items must have a time set beside it (# of minutes). Each line of the agenda is 1 entry by 1 attendee (or the convener).

Follow-Up Pop-Up Message Box: In the same pop-up box for Attendance Verification are 2 checkboxes. One for "Follow up note" and one for "Send gift to convener" (see below). Checkbox for each "Send follow-up note" should always be unchecked, for each new record item verified. Checking it expands the entire pop-up box downwards to allow for a message box. Un-checking this box collapses this portion of the pop-up box and returns to only the Verification section.

Messaging Area: this area of the pop-up box is similar in look to any +Message pop-up, except for: Recipients: (1) Convener, (2) Individual Attendees. Clicking this choice results in a recipient box expanding downwards and listing all attendees including convener. Member can remove any of these names by clicking on the "X", but members cannot be added. Future Send: The message can be sent at a later date. System allows dates starting from current date and no later than 2 weeks after the meeting date. Subject field: Maximum 35 characters. This field is mandatory (minimum 5 characters). Message field: This field is mandatory. (minimum 5 characters). Follow Up Pop-Up Corporate Gift Box: Checkbox for "Send corporate gift" is always unchecked, for each new record item verified. Checking it expands the entire pop-up box downwards to allow for a message box. The box also contains Subject field, Message field, choice of Gift options, CANCEL button, SEND button.

Attendance Verification Messages: Once the date of a meeting has passed, the Convener along with all Attendees receive a message in their Inbox (Message Centre) with the message category: "Verify Attendance". Both the Attendees and the Convener receive the same message containing: (1) A high-level summary of the meeting (date, place, Convener), (2) There is no Reply or Forward functionality, although this message can be deleted, (3) Text : "Please click here to Verify Attendance or go to your Upcoming Meetings in Face2Face". The "Verify Attendance" is only a hyperlink bringing the user to the appropriate pages in F2F.

Left Dashboard: Made up of Major Headers and sub-headers. The highlighted maroon box is always placed on a sub-header, wherever the user has clicked. Grouping of items: Left dashboard items are grouped into 4 Major Headers and their Sub-Headers are: (1) Executive Networking: News Posts, Societies, Face2Face, Profile, Scorecard, Colleagues. (2) Lifestyle: Executive Health, Professional Development, Sports, Leisure & Entertainment, Travel, Home & Cottage, Resto-Guide. (3) Marketplace. (4) Message Center: Inbox (with sub-folder for Intra-Society, Colleagues, PA Reach Out, Other Members), Drafts, Sent, Saved Messages, Saved Posts, Deleted.

The lifestyle section allows members to share preferences and recommendations on other categories such as luxury cars, holiday destinations, caterers for cocktail parties, boating and wealth advisors. Lifestyle section and the sub-headings in the left column are expandable so that users understand functionality. Centre column should also show how the layout works.

Login, Apply, Verification Email, Agree to Terms, Initial Registration: Main landing page of TBS includes Login Fields (Email address, Password, Forgot Password link, Login Button, Learn More), Apply Button (First Name, Last Name, Email Address & re-enter email address, Password, Apply button, the TBS Video and a message about exclusivity. The following 5 fields help determine TBS' Criteria for various Levels (Executive, Management, Staff). TBS applies a weighting and the resulting score places the user in the highest possible level for their given information. Whichever level the user achieves, they are placed into that level until their situation changes and they re-apply to for a potential higher level ranking. Whichever level they are placed, they receive a message: "Congratulations. You have successfully joined TBS in the ( . . . ) Level. If you feel that this Level is inappropriate for your credentials, please contact TBS Administrators. Otherwise, we are very sorry but it seems your current situation is not yet suited for our executive networking platform. Please be sure to return and try again once your situation has changed . . . " (1) Cash compensation: A drop-down menu with range of choices. "?" hover over brings up small box saying "Required to help establish member as an executive, (2) Company revenues, (3) Title, (4) Budget Size "Budget Size over which member has direct control", (5) Team Size "?" hover over brings up small box saying "Team Size under the executive's direct control Marketplace: These webpage details all TBS services available to members. Each item has an explanation of how the feature operates and how member benefits from a commercial or retail perspective. Header Box Atop Central Column: A box header which contains "Marketplace—" followed by either "Business & Corporate" (grey background) or "Personal & Leisure" (gold hue background), depending which sub-heading was chosen in the left column. By default, user is dropped into "Business & Corporate". Tabs: Below the header box and similar to F2F, these tabs result in different center column pages contain vendors at 3 levels: first organized by category of member's needs, second by sub-category of needs and third by list of actual vendors. View Purchase History contains a 2 sortable tables: Pending Orders and Past Purchases. Both have same columns: Date of purchase, User doing the purchasing, Invoice Number, Invoice Total, View button, Authorize button (only for Pending Orders). Accounts & Passcodes: Summarizes those users sponsored by the member, their type of account and authorization levels for shopping. Also contains a Generate Passcode button. Marketplace Accounts: Executives can sponsor other people to perform purchasing on his/her behalf by issuing a Marketplace passcode.

Membership & User Access Levels: We divide users of TBS into at least 4 groups: (1) Vetted Executives: The majority of TBS is made up of users who meet the executive criteria and who pay an annual membership due. These users have full functionality. (2) Non-vetted Executives (aka Provisional Members): Users who meet the executive criteria but whose references have not been verified. Until TBS manually verifies by calling the references, these users have limited functionality. Once they complete their profile, they can (a) Search for members but not contact them. View is restricted to a member's title, employer, list of Societies, Member since 20xx and the member's level of networking, (b) Search for societies, add them to their preferred list, but not join or "Enter", nor can they create a society, (c) message other Provisional Members, not full TBS members, (d), cannot access Colleagues functionality, (e) view Lifestyle section but cannot add to the threads. If a Provisional member fails TBS' reference checks, then that user's Name and Email move onto a blacklist. This blacklist must always be cross-checked against all incoming new members to the TBS platform. Furthermore, if a member passes the reference checks but is latter determined to misrepresent, that member will be ejected from TBS and their name/email also blacklisted. (3) Guest Pass: Users who meet the executive criteria but who want to test the system can get a free 1 month trial passcode from an existing TBS member. Once profile is complete and references checked, they may join a society. Guests can work with society creation, but they cannot create one. (4) Non-Executive People: Users that do not meet the executive criteria but who have been invited by the Leader of a society, using a passcode (e.g. Government or Academia) to join that society.

Message Center

Header Links (drop-down boxes): The drop-down message box contains, among other, list of Recipients (that can be added, modified or deleted), Add a Passcode, Cancel button, Send button, subject field, message body text field . . . . Additional fields for Meeting Requests include Date, Time, Type (virtual vs F2F), Address (if F2F), Video conferencing software (if applicable)

Location of Recipients: The location of recipients is the same for News Posts and Message Centre—to the right of the member's name. If there is only 1 recipient, write the viewee member's name. If only 1 name or entire list of individual members, colour of the name or list of "Individuals" is maroon. If recipient is a society, colour is blue. "Individual" or the names of the society have a hover-over tool-tip showing all recipients. Clicking on the name of the Society, or, clicking on the name of any individual member inside the tooltip will jump to that member's (or society's) profile. Non-Associated Members: Since the only way to message a non-Associated member is to go to that member's Profile page and click "Message Member", that specifically means that a message received from a non-Associated member cannot be anonymous and cannot be part of a list . . . it must be a 1 to 1 message.

Recipients: When clicking on one of the drop-down category links for creating a new message, the Recipients drop-down menu button has the following options: Societies, List of Colleagues, Individuals. If Individuals, can choose to manually input Colleague names or Chose from a pre-defined List that either TBS or member created.

Display Method for Threads: Replying to a message in Message Center results in a thread being initiated.

The date of the entire thread is considered the date of the most recent reply and so moves up to the top of a member's relevant message folders. When a message is added to a thread, then this new message and the member that wrote it is what appears in the summary message page (Inbox). Meaning, the original message is no longer displayed in the single-item record within Inbox. Note that if more than 1 member writes a comment on the same thread before a user views that thread, the Inbox continually adjusts and only serves up the most recent comment based on the time/date when the user chooses to view the thread.

The summary Inbox page includes member's colour icon, Thumbnail, Subject, Category, # of messages in the thread, Name, Text, Date/time, Shading (for unread messages, area behind the entire text is shaded maroon)

A Meeting Request message contains 2 buttons. Whichever button is clicked, that button is greyed and the other disappears. But the text of each button changes slightly to: "Accepted" or "Declined" (past tense).

Right-side Options in messages: In summary page, only an "x" for deleting the message. Once clicked through to the detailed message (and thread if more than 1 message), then options include Reply, Reply All, Forward (if Allowed Sharing was chosen, can forward to one's society, list of Colleagues, or individual Colleagues), Save Draft, Delete, Mark as Unread, Block Member Comments Box: Located at the bottom of all message threads is a fast reply box: text input field, Save Draft, Reply, Reply All, Cancel button and Send button.

Other Messaging Functionality includes Allow Sharing (message originator decides if recipients can forward the message), Urgent (all recipients will receive an external email, SMS text or none . . . depending on their notification settings in Account pages), Add a society Passcode.

Other Folders: Sent, Drafts, Saved (Messages), Saved (Posts), Deleted.

Message Box Appearance: all pop-up boxes (Forward, +Message, +Meeting) as well as drop-down message boxes (from header links in Message Center pages) follow the same procedure for appearing, disappearing and recovering: Appear: click on the appropriate button or link, as specified in these mock-ups. Disappear: 4 ways for the pop-up or drop-down boxes to disappear: (1) click Cancel: all work lost, (2)

click Send: work is saved and sent, (3) clicking on any other web page results in loss of work (unless Save Draft was clicked first) and movement to that other web page, (4) clicking on any other header link results in loss of work to date and a fresh drop-down box. Recovering a message is only possible if Save Draft was used General Comments on Messaging Colleague Requests: Receiving an invitation to be a Colleague is not a message. No message record is created and nothing appears in one's Message Center, nor News Posts, until the Colleague Request is accepted. At that point, all of their Colleagues received a message in News Posts under Status Updates as to which members are now connected. The requesting member also received a message in message center: auto-generated message from TBS informing them that <name> member has accepted their Colleague request.

Coloured Logos: Beside each message (in News Posts, Message Center, F2F, etc), 1 or 2 coloured icons appear. These designate the type of association those members have to the recipient member. Hover-over tooltip (over thumbnail or member name) will display Mutual Colleagues and Mutual Societies. Hover-over the coloured icons produces a help chart showing the 4 colours and their meaning, which matches exactly with the colour-coded sub-folders of Inbox (see Message Center): Gold for Society in Common, Blue for Colleagues in Common, grey for Non-associated members, red for TBS messaging Inter-Society Messaging: Members of a Society can message all members of the same society, whether anonymously or not. If a member of one Society wishes to contact all members of another Society, they must send an individual message to the Leader of that Society asking them to do so.

News Posts

This page is considered a member's home page and acts as a news wire for non-member specific information which is of concern to a user's Associated members, unless configured otherwise. This means that the maximum number of members that can see a user's Posts is that user's Associated Members, and the minimum are their co-society members. The drop-down Posting box contains: Recipients whether choosing entire society or list of colleagues (can Add, Modify, and Delete individuals), Subject, Message box, Checkboxes (Anonymous, Urgent, Allow Sharing). If member is a society leader, Add Passcode button appears along with +Invite with which a new member can be sent an invitation message and the passcode.

Drop-Down Menu Options (all Posts) located on the right side include Reply, Reply All, Save, Forward, Delete, Never Accept Posts from this member Display Method for Threads: If a CCed member replies to a News Posts item, it will begin a thread. The date of the entire thread is now considered the date of the most recent reply and so moves up to the top of a member's News Posts. Moreover, if the thread has more than 2 replies, then by default, the original message +2 most recent replies are displayed in the feed along with a link called "View All Messages". Clicking this link will expand the thread and simply push down the News Posts items below it, similar to FB. This link is a toggle switch: if expanded, it changes to "Collapse Message List". Or, if member clicks on any other News Posts item or any other page on the website, the first News Posts thread then automatically collapses. Note: if there are only 1 or 2 replies in the thread, then the toggle button/link VIEW ALL MESSAGE should not appear. It should only appear if 3 or more replies occur.

Member Tooltip: A tooltip pops-up when hovering-over member's name or picture. This tooltip contains their thumbnail, name, title, employer, Societies in Common and Colleagues in Common. See section on UI.

Status Change Category: The following events will create an auto-generated Post by TBS and will be sent to all of a member's Colleagues and Intra-Society members (called Associated members): Accepting a new Colleague. Change of position (title/function) by a Colleague, Change of employer (including retiring) by a Colleague, Join a society, Leave a society Promo Codes & Passcodes Promo Codes: This is a promotional code with the sole purpose to offer a discount (from 10% to 100%) off the membership price of TBS. Promo Codes are given out only by TBS administrators and generated in the same methodology as TBS members, except from Admin user pages. Promo Codes do not affect the functionality of a member or a society. Coding system works the same as Passcodes except first letter is "F". Similar to Passcodes, Promo Codes have an expiration.

What is a Passcode?: Special purpose access codes to allow non-TBS users to access TBS or access TBS+access a specific society, or allows existing TBS users who do not achieve REC of a society the ability to bypass that REC. Passcodes may also offer a discount inherent in their coding (from 10% to 100%) and may have an expiration, but will always involve limiting the configuration of certain functionality of members and access to societies.

General Breakdown of Passcodes. There are 3 Passcodes for Non-TBS Members: (1) Guest Pass: for those who meet TBS' Executive Criteria and want to try out the platform. This passcode may or may not include access to a specific Society. NOTE: this Passcode can be issued by a member who is not the Leader of a Society, (2) Non-Executive Passcode: for those who do not meet TBS' Executive Criteria, it allows access onto the platform but must include 1 specific Society access (public or private). Very limited functionality beyond networking in that 1 society, (3) Marketplace Passcode: for an existing TBS member who wants their subordinate to handle purchasing for them. Can only access Marketplace. NOTE: this Passcode can be issued by any member, not only Society Leaders.

Passcodes for TBS members: (1) Bypass REC: for those TBS members who do not meet the Required Entry Criteria (REC) of a particular Society, (2) Private Society Access: to enter a private society.

Expanded Explanation of Passcodes: Note that certain types of Passcodes may, or even require to, be combined. For example, Non-Executive Member passcodes MUST be combined with either a Private Society Passcode or with a Bypass REC passcode. (1) Guest pass: Potential new TBS members are given month free access to TBS. They have full site functionality, although must still be vetted and are probationary members until TBS checks their references. Further, their Profile page states that they are Guests and not Members. TBS must track the passcode to know when their free time expires at which point they are asked to pay for annual membership. The 1-month time only begins once they have initially signed-up. (2) Non-Executive Member Passcode: Allows people who do not meet TBS's executive status criteria to access TBS. Their fees may also be discounted. Their functionality would be limited as described in Societies. They may belong to either Public or Private societies. Non-Executive passcodes must be combined with either a Private Society Access or a Bypass REC (public society) passcode. The passcode must be entered twice because the only situation where a non-executive member is allowed to enter TBS is due to a Leader looking to invite them to a society. Enter the Passcode as follows: (a) Upon registration: the code would determine any discounts and any limitations on the user's functionality, and (b) at the Society's Door (on the society's Profile page) in order to enter the actual society. (3) Private Society Access: Meant for people who may, or may not, meet the executive status criteria, but who want to be invited to a closed group. Private Society codes simply give access to that society and thus act the same as the Bypass REC Passcodes (see (iv) below). This passcode does not limit the functionality of any member, rather only to allow access to that society. A member would enter the code on the Society's Door. (4) Bypass REC: Even if a user meets the executive status criteria to enter TBS on their own, they may not meet the REC of a particular society and thus cannot join. However, the Leader can produce Passcodes to allow these members to bypass the REC and join the society. The passcode are entered in the Code Input field on the Society's Door (Society Profile page). This type of Passcode does not limit the functionality of a member. It is strictly for accessing societies. (5) Marketplace Accounts: Once a user uses a Marketplace Passcode to enter TBS, they can create a Marketplace Account. These are memberships held by non-executive people who report to TBS executive members in real life, or are the member's spouse. These people have very little functionality on TBS except as described in Membership & User Access Levels. Purpose of these accounts is to give a user full access to the TBS Marketplace for purchasing. These memberships are free and are completely controlled by the executives that set them up. All Marketplace Accounts are linked to the Executive that produced the Passcode. A Marketplace Passcode can be generated from within a Society page, or from within Marketplace pages. See Marketplace for more details.

Discounting Passcodes: A discount can be applied due to either TBS employees applying a discount, or the non-TBS member is not an executive (e.g. University Professor), then TBS database provides for a discount based on type of non-TBS user.

Validity & Timeframe: Timeframe for Guest Pass is set to 1 month and can only be extended by a TBS employee. All other Passcodes are, by default, indefinite so long as member has paid their membership dues (if applicable), except if the member that generated the Passcode chooses to delete the Passcode, or the member has applied a specific time period to that Passcode. Leaders can configure expiration of passcodes from 1 month to indefinite.

Security of Passcodes: Imperative that all Passcodes and Promo Codes are kept classified. No Human Involvement: Passcodes are randomly generated by TBS. Inputting Wrong Codes: Users have 3 attempts to enter the proper code at which point they will be locked out from the procedure. Removing Passcodes: Leaders or TBS employees may, at any time, remove the validity of a passcode. Tracking: TBS system tracks all issued Promo Codes and Passcodes based on the email that they were sent to so that they cannot be forwarded to other people.

Who Can Produce a Passcode? All TBS Members can only produce 2 kinds of Passcodes: Guest Pass (1 month trial on TBS) and Marketplace Passcode. Society Leaders can produce every kind of Passcode.

Coding System of Passcodes: All Passcode are assigned alpha-numeric codes made up of 12 characters, randomly generated except for certain characters as follows:

First Type of Passcode: The first letter of all Passcodes designates the Type, currently 6 types (including Promo Code as the 6th) and thus coded A to F. Does not have to be capital letters.

Optional Secondary Type: If first type of passcode was (i) above, then a second type of Passcode is optional. If chosen, then second character of Passcode will be the "1" (Private Society) or "2" (Bypass REC). If no secondary type is chosen, then second character of passcode will be zero "0". Thus, only possibilities so far are "A0 . . . , A1 . . . , A2 . . . )

Mandatory Society Access Type: If first type of passcode was (ii—Non-TBS Member . . . see above), then the society access type must be chosen. Then second character of Passcode will be the "1" (Private Society) or "2" (Bypass REC). Thus only possibilities so far are "B1. . . " & "B2. . . "

No Society Access Type: For choices (iii), (iv) and (v), there are no secondary Passcode type choices and so again, the second character would be zero "0". Thus some possibilities so far are "C0 . . . , D0 . . . , E0. . . ". Must start with C, D, or E.

Discounting: Regardless of whether or not the person gets a discount, character 3 and 4 of each passcode determines the discount. 00=no discount. 10=10%, 20=20%, etc. Note that 99=100%. Examples: A199xxxxxxxx=Guest pass, 100% discount. B150xxxxxxxx=Non-TBS user with access to a Private society and 50% discount on fees. Note that if the choice is a Marketplace Passcode, the "discount" code is automatically 99 as all Marketplace Passcodes are free.

Validity & Timeframe: The 5th and 6th character of every passcode determines the timeframe for which a Passcode is valid. The 5th character can be any number from 0-7. The 6th character can be any number from 0 to 9. So the range is from 01 to 79 (1 to 79 months). However, mockup Society screen 6 ("Generate Passcode") has 1-12 for months and 0-5 for years. That means maximum 5 years+12 months=72 months. Note that there are no "indefinite" passcodes.

Additional Characters: In order to have security for our Passcodes and ensure we have enough passcodes, the total length of a passcode will always be an alphanumeric character string of 12 characters. The last 6 of which are randomly assigned by TBS but specifically tracked like SKUs or Barcodes. These last 6 characters create the uniqueness of each Passcode. This means 62^6 (56 billion) possibilities. Note that capital and small letters are not the same thing but rather different types of characters.

Personal Aide (PA) & Marketplace Specialists

PA's Role: Complete platform support for TBS members. 1 Personal Aide can be assigned up to a maximum of 50 members. PAs can perform nearly everything on behalf of a member, on a member's account, except: (1) Cannot see any messages or posts in any member's account which means a PA cannot Forward, Reply or Reply All on behalf of a member but can initiate any type of message or meeting, (2) Cannot click on "View Communication History" button which shoes older messages of the member, (3) Cannot cancel a member's account, (4) Cannot change the password on a user's account, (5) Cannot change any settings in Security settings page, (6) PA's Limitation in Marketplace: cannot complete the purchasing process, rather, can only set up shopping cart.

PA Accounts: Personal Aides should have somewhat different screens than members have. Their right column should be the list of all the members they are responsible for and clicking on any name would then morph their left & central columns to emulate that member's screen. Then the PA can effect change on that member's account. PA's Message Center would has 2 folders: 1 for messages from members and 1 for messages from TBS employees. However, the following are the limitations for PA's: Cannot view any existing Posts or Messages, nor any communication history of any member. Cannot cancel a member's account. Cannot change the password on a user's account. Cannot change any settings in Security settings page. PA's Left DashBoard: PA's can log into their member's accounts and emulate the left dashboard & central column of that member. However, if the PA is not logged into their member's account, then they are in their normal account (PA screens) which differs: News: contains only Posts from TBS administrators or other PA's. Societies: Can only belong to PA or TBS-based societies. Lifestyle: PA's have their own lifestyle portal which is not viewable by TBS executive members. Profile: Scaled down profile as no need for email, cell#, job status, mail, title, company, revenues, # of employees, team size, budget size, function, direct reports, NAICS codes, address, cash compensation, job description, your expertise, or References. Further, PAs have No Marketplace. In F2F: PA's can set up Meeting Requests but only with other PA's, with their members, or with TBS management. They should be blocked from accessing other members. They can be Colleagues with any of the member they take care of plus any TBS employee. Their Scorecard: Contains 2 areas: (1) Upper Area: summary table that includes member's names, Points Earned during the month for a given society, MMPT (Minimum Monthly Point Total) that must be earned in order for that member to remain in that society, Outstanding Messages: number of unread messages for that particular society, Outstanding Meeting Requests: number of unread and unactioned meeting requests for that particular society, Shading: any member's points earned that is low at specific points towards the end of each month versus their MMPT for that society shows up as red or yellow shading, depending on the day of the month (closer to month end=red). A Personal Aides Lower Area of Scorecard shows their personal performance as Scorecard also tracks messaging and F2F between (a) them and TBS, and (b) them and their members. This table looks identical to a member's Scorecard table in a member's account.

Top Area of Central Column Contains: (1) Name of page: Similar to normal member screens, the upper-most line contains the name of the page (e.g. News Post, Message Center, etc) following by a hyphen ("-"), followed by 1 of 2 possible texts, (2) "My Screen": tells the PA that they are not logged into a member's screen but in fact viewing their own account. If PA is logged into a member's screen, then instead of "My Screen" it says "Member's Screen (first name, last name)".

Logout of Member's Account Button: This button ONLY appears when a PA is logged into a member's account. But it is then on EVERY page in the top-right corner of central column. Clicking this button logs out of the member's account and puts the PA back into their won account pages. Note that if instead of clicking this button, the PA clicks on one of the member name-links in the right column, it accomplishes 2 things: (1) Logs the PA out of the current member's account, and (2) Logs the PA into the new member's account Right-Column: The Ad area is replaced by a table of Member Accounts: displays a table with 2 columns (a) Member's name, (b) date member last logged on. Each member's name in this table is a link which acts as a toggle-switch, changing the PA's screen to that of the member's screen (emulate) except for some reduced functionality specified below:

Audit Trail: Each event/keystroke that a PA does on behalf of a member's account is tracked so TBS can hold them responsible, or protect them, if an issue arises. However, the Audit Trail which is visible to each member in their Account Pages, does not show all those details, but rather shows summary of actions completed or not completed. Each line of the table contains: Member's name, Log-in date, Start Time, End Time, Duration of time logged-in to member's account, Action Initiated: all website functionality is broken into a list of possible actions(system chooses from this list), Outcome (completed vs. abandoned), ">" symbol (if clicked on brings user to that particular action).

Profile Pages

Profile Pages have 2 Aspects: (a) Initial Input of information, and (b) Views and Editing of Profile information once the member is vetted. See below.

Initial input and creation of one's profile: No statistics, badges or accolades. These are the pages that must be completed in order for users to have access to TBS web pages. A % completion coloured bar should show, in 20% increments, a user's progress. Info is thus broken down into 5 fields (5*20% 32 100%): Personal Info, Experience (company & professional), Education, Lifestyle, References. The following input fields for all sections are required to complete registration and become a TBS member, unless otherwise stated:

Personal Info: First Name, Last Name, Nickname, Photo, Gender, Date of Birth, Job Status (Full-time, Consultant, In-Transition), Mailing Address, Country, State/Province, City, Address, Suite, Zip/Postal Code, Mobile#, Main Email, Alternative Email, Designations Experience (Company & Professional): For each job, members "Add Experience". The following fields appear on all Add Experience pages, except as indicated and except for "Current Position" (see below). All fields are required unless designated otherwise: From year, To year, Current Position, Base Compensation last 3 years, What are you known for?, What is your expertise?, Title, Company (If name does not exist in TBS database, user needs only to click on "Add Company/Add Office" button and complete the process of adding all relevant company information), Public vs Private company, Function within the company, company revenues, # of Employees, Team Size, # of Direct Reports, NAICS Code (Levels 1 to 4), Office Phone, Extension, Country, State/Province, City, Address, URL, Job Description, What are you known for?, Describe your expertise, Education (all Required Fields): From year, To year, name of University, Location, Degree, Field of Study.

Lifestyle: There are 5 categories of Lifestyle information. All checkboxes in each category are optional as TBS is trying to determine user's preferences: Sports, Leisure, Travel, Home, Professional Development References: 4 references are required of which only 1 may be from someone working for same employer.

a. Top Section of Profile Pages: Members have 4 different views showing different degrees of their personal information, professional information and TBS-based information (stats, accolades, etc). The views are regulated depending on whether the viewer is (1) the member, (2) an associated member, (3) a non-associated member, or (4) a Provisional member.

Buttons Available on Profile Page: +Meeting with Member: Clicking this button results in a pop-up message box the exact same as clicking on same item in +ReachOut. +Message Member: Clicking this button results in a pop-up message box the exact same as clicking on same item in +ReachOut. +Colleague: Sends an automated message to that member asking if they would like to be a Colleague of yours.

View Member's Colleagues Button: This button is only available to users who are Associated with that member and allows them to see the member's Colleagues.

History of Communication with Member Button: Clicking this button results in the list of all messages (not Posts) between the 2 members.

Right Column House 2 Items: Reach Out drop-down menu and Advertising box. Reach Out Drop-Down Menu contains 3 options: +Post (Results in new post pop-up box), +Message (Results in new message pop-up box), +Meeting (Same as +Message but only for Meeting Request). Below +ReachOut is another button called +PA Reach Out (Same as +Message but no recipient since the message is only going to member's Personal Aide).

Scorecard & Performance Measurement System

Purpose of Points: The core mandate for the TBS is to create interaction, and thus networking, for its members. TBS measures all interactions across the platform and rewards members with accolades, Boardseats and the ability to use points to buy gifts for other members. At the same time, poor performance in the form of not achieving one's MMPT in a society may result in expulsion from that society.

Points for F2F Meetings: The reward is incremental in terms of number of people attending: a 3-person meeting gets 1 more points than a 1:1 meeting (2 people). For each additional person, add 1 point to the value everyone to each attending member.

Summary Scorecard and Actionable Items Table: Column headers include: Society Name, Points earned this month by society, MMPT, Outstanding Messages, Outstanding Meeting Requests.

Detailed Points Table: This tables details by action-type how many points the member has earned. The timeframe is configurable as is the choice of society (or TBS overall). Items at the top of this table include: Choice of Scope (Drop-down menu of a member's societies—if more than 1—, plus "All of TBS"), Choice of Timeframe (Choose a month or range of months/years). Columns include: Action Type (from the list of the Points Allocation Table), Type of Member (society members, Colleagues and non-associated members), Number of Members (only for F2F events), Quantity: (number of times the action was taken during the timeframe), Point Value (based on the Point Allocation Table), Total Points (Quantity multiplied by Point Value)

Member Points Table by Society: This table shows the points earned by each member of a society and displayed in only 2 statistics per member (MSPT & MSAPMT).

Overall Points Table: Purpose of this table is to display various statistics for 3 areas of the website: (1) Personal performance metrics measuring points within only 1 Society, (2) Personal performance metrics measuring all of a member's points across entire website, (3) Entire Society-based performance metrics.

Search & Advanced Search

Basic Search: Based on a keyword search. User must choose 1 of 4 types of searches: Members, Companies, Messages, Societies.

Advanced Search: User must first choose 1 of 4 types of searches (see Basic Search above), then user may choose from many more data search fields based on TBS database. For each of the 4 types, the following data fields are searchable: Members(First Name, Last Name, Employer, Title, City, Country, Networking Level), Companies (Name, City, Country, NAICS Level 2 or 4), Messages (Category, Subject, Text), Societies (Name of Society, City, Country, Type, Function, NAICS Level 2 to 4).

Search for New Society Members (aka Preferred List of Invitees . . . see Societies): A specific search for identifying potential new Society members is available in both the advanced search function and from a button in every Society page (see Societies). Choosing this search first results in another drop-down menu asking for which society the user would like to search for potential new members. Results in the same columnar results as a Member Search, but with the addition of 2 columns: LPT (Lifetime Point Total) and MAMPT (Member's Average Monthly Point Total which is the LPT/# of months as a member of TBS). Options: add 1 option to drop-down menu: +Add to Preferred List: results in a pop-up message box confirming the addition Security: Password: Enforce alpha numeric and length: minimum 6 characters including 1 number. Show strength bar. When someone forgets their password and clicks on the link, they receive a verification email to their email address on file that does not contain their password, but rather a link that resets their password and they must then chose a new one. Users have 3 chances to input correct password before the account associated with that email becomes "locked-out" at which point user must contact a TBS employee.

Societies

Purpose: To maximize networking and interaction in order to foster knowledge exchange and other common topics. This mandate is a main element of TBS' software platform and website design. Furthermore, it is meant to act as the continuity between face to face encounters. This secondary facet of TBS runs in parallel with the web site (see Face to Face)

Layout: Platform Society Pages Consist of 2 Areas

Upper Area: housing the scrollable thumbnail viewer and individual member information (for that particular thumbnail). 3 buttons are present in this area: (1) View Society Profile button (show all the information that was inputted by the creator/leader, having to do with that society) (2) Manage Passcodes button (changes the entire centre column to show user their existing passcodes they have generated), (3) Leader Info (Brings user to same page as Leader Info in Footer Links. Informational only about leader's responsibilities).

Lower Area Contains a Series of 3 Tabs: (1) Members (lists in tabular form all current members of that society along with thumbnail, name, title, company and various performance statistics), (2) Upcoming Meetings (mimic exactly the Upcoming Meetings in F2F page except only those meetings related to that specific society), (3) Preferred Invitee List (In order to help populate societies, all existing society members can search TBS membership looking for potential new members and, from that search results, can invite them to view that society's profile, if a member, or grant direct access via passcode, if a Leader).

Categories of Societies: First, the society is defined by its openness as either Public (can be viewed and possibly access by any TBS member meeting the required entry criteria, or Private (only accessible via passcode). Second, 1 of 4 types of society: (1) Industry based, (2) Function based, (3) Specialty (anything else: e.g. women under 40, Cisco Alumni, etc), (4) International (where people from different countries come together)

Size: The number of members per society can be configured by the Creator or Leader. Default setting when creating a society is set to the max # of members. Industry & Function Societies: min 15, max 25. Specialty Societies: min 15, max 25. Private Societies: min 5, max 25. International: min 10, max 25

Timeframe to Fill: When a member creates a new society, they must achieve the minimum # of members within a period of 3 months (Formation Period). TBS tracks the date from which a society is formed and issues warning messages to the creator during the formation period in the case where membership is lagging below the minimum required.

Minimum Monthly Point Total (MMPT): Relates to the minimum monthly requirement of earned points per member for each society. Points are allocated based on the points awards table (see Scorecard). The Creator or Leader of each society can configure the MMPT as follows: Industry & Function Societies: min 10, max 50 (default=25), Specialty Societies: min 10, max 50 (default=25), Private Societies: min 0, max 25 (default=10), International Societies: min 5, max 25 (default=10).

Failure to Achieve MMPT: If a society member has not achieved their MMPT for a society for a given month and has not corrected the situation within the provided timeframe (10 days of month end), they are automatically removed from the society and a society message is sent out to all co-society members Accessing a Society: from the society's profile page, a user can join the society 1 of 2 ways: (1) use a passcode, (2) achieve the Required Entry Criteria (REC) which is automatically verified by TBS database. If at least 1 REC is not achieved, user cannot enter the society and receives a message saying so. If user meets all REC, they immediately enter and are presented with a disclaimer that they must agree to.

Clicking on the header link "Create a Society" atop of Societies page results in a drop-down box similar to +Meeting in Message Center header link. Fields to be completed include (1) Type of Society (1 of 4 listed above, however, if international is chosen a radio button appears asking for region vs country vs distance), Name (creator can choose any name), Logo/Photo (creator can upload a graphical image to represent their Society), Public vs. Private, Location of HQ (automatically populated by the system based on the creator's address of employer. Defaulted to city hall of that city. Creator can then change the address), Established (date is automatically inputted by TBS), Minimum Monthly Point Total required, Max # of members, Purpose (maximum 120 characters), Description (maximum 200 words), Required Entry Criteria—REC (Used to restrict access to public societies only. These criteria are chosen by the society's creator/leader based on available data fields from TBS database), Preferred Entry Criteria—PEC (similar to REC though not required to join the society). Once the society has been created, the list of types of allowed members shows up on the Society Profile page (see Society Profile for more details)

Clicking on the header link "+Society Message" atop of Societies page results in a drop-down box that is identical +Message in Message Center header link, the only difference is that the recipients field is pre-populated with both the society's name as well as all the individual members in that society. Individual names may be removed by clicking on "X" beside any member's name. Additional names cannot be added.

Clicking on the header link "Create a Society Meeting" atop of Societies page results in a drop-down box that is identical +Meeting in Message Center header link, the only difference is that the recipients field is pre-populated with both the society's name as well as all the individual members in that society. Individual names may be removed by clicking on "X" beside any member's name. Additional names cannot be added.

Clicking on the header link "Resign from a Society Meeting" atop of Societies page results in very simple drop -down message box. Recipient's field displays only the name of the society (which can be changed to any society the user belongs to) but individual names are not present since the message is going out to all of that society's members. Resigning from a Society results in 2 types of messaging: (1) Message Center: As described above, a message sent only to the members of the society from which this member is resigning. The message is either custom written by the resignor, or they use one of TBS' templates, (2) News Post: All Associated members received a Status Update including the members from the Society you resigned. Status Update simply says "<name> has resigned from <name of society>". If a resigning member is both a society member and colleague with someone, it is important that only 1 News Post is sent Clicking on the header link "Generate Passcodes" atop of societies page results in drop-down box with several fields. The first field dictates the rest of the data fields Type of Passcode.

There are 5 types (see Passcodes).

Who can create a Society?: Any "vetted" member: from Societies page, or TBS administrators may set up "shell" societies or may help assemble members to get together Other Societal Restrictions: Maximum of 3 people from a given company may be in the same public Society. Private Societies do not have this restriction.

Minimum # of Society Meetings per Annum: Whenever any society is created, TBS automatically generates a calendar which includes 6 suggested dates for Society meetings per year. While TBS suggests 6 dates, each society is required to hold minimum of 2 meetings per year, but, minimum 1 every 6 months. Only the society Leader can modify these dates, and add more dates. The leader establishes and has control over the society's calendar. A meeting is considered a Society meeting if the greater of: (1) 40% of its current members attend the event, or (2) 6 members attend the event. The following situations are exempted from the annual meeting rules: (1) International & Inter-Regional societies due to geographic distances, (2) Private Societies, (3) Societies who ask TBS to waive the annual F2F requirement. Upon receiving such a request, TBS administrators will determine based on the Society's overall networking (based on points) and other relevant factors, whether to grant the exemption. If a society fails to hold the minimum # of meetings, it may result in dissolution of that Society, on a case by case basis. Meetings are required each 6 months (minimum). At the 5th month mark, a reminder message will be sent to the Leader. Should the society meeting not occur, TBS may dissolve the society or give an exception based on total networking value of all members, the purpose of the society and the needs of its members. Each member of each Society has a requirement not only to achieve MMPT, but also to attend at least 2 Society meetings per year. If only 2 were established for the Society Timeline, then they must attend those 2. To help ensure attendance, as soon as the Society's annual calendar of meetings is established by the creator/leader, an auto-generated message is sent out to all society members explaining the details of the timeline & F2F meetings. Further, each member receives that number of Meeting Requests from the Leader/Creator: so if 6 society meetings were created, each member will receive 6 separate Meeting Requests with the various dates, locations, agenda, etc. Accept/Decline buttons and the rest of the message is all standard. Location, time, agenda, and type of meeting must all be configured. This is very similar to "+Meeting" functionality.

Failure to attend minimum number of society meetings results in expulsion from the society.

Competition between Societies: In essence, a society is a team and competition, measured by statistics, helps motivate members to participate as they are responsible to others in the group. Fostering competition between societies results in more interaction and networking between members as well as loyalty to their Societies. The preferred method is to track and display point totals. When members are searching to join Societies, one of the sort capabilities will be to sort on any of the above statistics, thus creating demand for those societies with greater performing members. Societies will be ranked geographically based on their performance statistics (by city, region and country).

Society Leader: The Leader is like a CEO and is the online captain and moderator of their society. In order to encourage Leaders to step up in the creation and management of societies, TBS give them broader powers. Leaders can (1) kick out any Guest (member using a Guest Pass), (2) Modify the Society's description, configuration, logo, photo, etc., (3) Modify the REC & PEC on the Virtual Door, (4) Can invite any TBS member to his society with an embedded link from within a message and have the ability to bypass all REC & PEC if that message was sent from the New Member Search from within the Society, (5) Can invite any TBS member or non-TBS person to join his society by giving them a Passcode which bypasses the REC & PEC, (6) Leader's are also responsible for promoting networking and establishing a timeline for society meetings Private Societies: A society is considered private if it only accepts members by invitation-only and not open to TBS members based on REC criteria. The members in Private societies are not visible to anyone else on TBS unless they are also in non-Private societies, or, if they have clicked the "Go Public" button. These societies can only be joined by using a passcode.

Society Profile Page: Each society has a profile page containing with 2 major areas: (1) Upper Area: Type of Society (Industry, Function, other), NAICS codes, Purpose and description of the Society, Photo or Logo, Name of Society, Name of Leader, Location (HQ), Established date, Access (Private or public), EDIT button (only for leader), VIEW PERFORMANCE STATS button: Results in a pop-up box displaying a table with various statistics derived from scorecard (TBS' activity performance measurement system) although these stats are not viewable if society is Private, # of Members (Current, Maximum, Available), Restrictions on # of member by criteria (non-Private societies only)

Lower Area—Public Society only: Displays the Society's Door which resembles a large double-door that would be used to access a boardroom. On the door there are several functionalities and information: Name of society, Passcode Entry box, list of REC criteria, list of PEC criteria, Enter button. If REC is not achieved, a pop-up box with a message "You currently do not meet required criteria for this society." If member is not "vetted", they cannot access any society. If user is already a Member a pop-up message box saying "You are already a member of this society". If user is not yet a member the double-doors creek open and a pop-up box appears saying "Congratulations, you have successfully joined <name> society. Please read the following disclaimer and click the appropriate button." Below it is a disclaimer that must be agreed to. Avoid "aiding and abetting" offenses by doing our part to not host those kinds of collusive conversations. Look at rules of conduct for meeting of competitors (industry societies). If user checks "disagree" followed by "GO" button, the doors close again. If user checks "Agree" followed by "GO", they pass through the doors and are taken to the screen for that society (see screen 1 for main society view). If a user attempts to access a society for which there are no open spots, a pop-up message occurs saying "We're sorry, but there are currently no available spots in this society. Please have a look again in a few weeks or so."

Lower Area—Private Society only: Society Door looks and acts the same as that of public Society (above), except that there are no REC or PEC. The only thing that shows up on the door is a text-box that says "Passcode" in it and the large ENTER button. Entering the correct or incorrect passcode has same result as Platform Society (above). Even if a user has a passcode, if there are no available posts, a pop-up message occurs saying: "We're sorry, but there are currently no available spots in this society. Please have a look again in a few weeks or so."

Statistics & Metrics

Traffic Stats: Monthly web page views, incoming internet domains, incoming geo-location (IP based), monthly unique visitors, monthly repeat visitors, trackbacks, average time spent on site, # of new registrations per month, Structural Stats: Connections (unidirectional, bidirectional), network size, social instances to which someone belongs, # of times each button/link is used by each member and in aggregate, # of members, % of active and inactive members, leadership roles created and filled, number of social instances, number of instances per text model, total # of members, # of societies, # of created societies each month, # of members joining a society, # of members leaving a society, average # of colleagues per member, average # of new colleagues per member per geographic location (urban center)

Tasks: Social tasks in which someone has participated or content that he/she created, % of member task participation, % of task completion, success stories and outcomes from completed tasks, abandonment, content submissions and postings, Social instances with high degree of completion. Face time with each member, total times met F2F with each member. Virtual meetings with each member: time logged and total # of instances. # of times a member accept an invitation to a meeting but does not show up. This should be public info on TBS.

Programs: For marketplace offerings, surveys and other programs, track # of members and which members are using them and how often. Referrals: track which member sent out a referral email and who accepted it.

PA: # of times each member reached out to PA, average thread length per PA reach out. PA productivity: # of members supported per month, PA time logged per member, average PA time per member, top selling instances.

Societies: Measure average as well as Median # of member's points per Society and per Society-Month. # of societies per member. # of societies for each type of Industry & Function.

Messaging: # of News Posts items received per member per month, # of messages received per member per month, average % viewed for each, average % responded for each (not only each of News vs Message Centre, but also for each Category of News and each Category of Message). Total # of members who viewed a News Posts item. Average # of characters per member per message.

Business: Purchase history, revenue generated, trends, customer satisfaction (summary of reviews/ratings), repeat customer rate.

Colleague Requests: need to track which member is sending out how many Colleague requests and how many of those requests are being Accepted vs Declined. Reason is to track those members trying to connect with everyone but getting turned down for possible website abuse.

Ascension

TBS recognizes long term members and valuable members by creating Board Seats for all Societies. Societies have 3 to 5 board seats available though those seats will remain empty for minimum 1 year. Thereafter, an automated algorithm will produce candidates, existing TBS members, and offer them a board seat on a society. Should they accept, they will have that seat permanently unless voted off by standard voting rules of that society. Members are chosen by TBS based on a proprietary algorithm which includes many of the statistics available on member's Scorecard page. Board members must be drawn from the pool of Society members from their respective level while Advisory members can be drawn from a level higher (in the case of Management or Staff Levels). Note that not all members with large points accumulated will be invited to become board members. Becoming a board member does not mean relinquishing society member status. A user can be both a board member of one society and a regular member of another society. Members can be on multiple boards. Similar to the real world, the more valuable a member is, the more demand there will be for them to act as a board member. Board members do not receive all messages from Societies, rather, only those messages that individual society members choose to share.

Variations of the above described business networking system, method, structures and components will be apparent to those skilled in the art and such variations are considered to be within the scope of the present invention. Thus, modifications and alterations can be used in the system and method of the present invention without departing from the scope of the invention.

What we claim is:

1. A method for business networking using a computer-implemented online social networking system, the method comprising:
   receiving and storing in a database structure a plurality of individual member profile records, each individual member profile record including personal information and experience data input by that individual member;
   receiving, at the online social networking system, a society creation request associated with one of the individual members as a creator, and storing a society record defining the society;
   receiving and storing in the society record, at the online social networking system, from the creator, required entry criteria associated with the society, wherein said required entry criteria specify characteristics required for membership in the society, and wherein the required entry criteria are selected from personal information and experience data fields defined in the online social networking system;
   receiving a request for membership in said society at the online social networking system, the request being associated with a requesting individual member associated with one of the individual member profile records, and, in response, determining whether said one of the individual member profile records contains personal information and experience data that meets the required entry criteria associated with the society and,
   if so, transmitting an acceptance message to the requesting individual member and,
   if not, transmitting a refusal message to the requesting individual member,
   wherein each individual member profile record has an associated individual points record, and wherein the individual points record is credited with one or more points when the associated individual member participates in a meeting with another individual member and participation data is received by the online social networking system, and
   wherein receiving said participation data comprises receiving data regarding participation from said individual member and receiving verification data confirming participation from another participant in the meeting.

2. The method claimed in claim 1, wherein the individual points record is credited with one or more points when the associated individual member exchanges messages with another individual member via the online social networking system.

3. The method claimed in claim 2, wherein said one or more points are further associated with the society if said individual member and said another individual member are both members of the society.

4. The method claimed in claim 1, wherein the society record further stores a minimum monthly point total required for continued membership in the society, and wherein the system determines, monthly, whether each member of the society has accumulated points associated with intra-society activity that meet or exceed the minimum monthly point total and, if not, then expelling such member from the society.

5. The method claimed in claim 4, wherein, prior to expelling such member, the system transmits a warning message providing said member with a minimum time in which to accumulate a specified number of points associated with intra-society activity to prevent expulsion.

6. The method claimed in claim 1, wherein said personal information and experience data fields include selection of one of a plurality of pre-defined hierarchical titles.

7. The method claimed in claim 1, wherein the individual points record is credited with one or more points when the associated individual member engages in non-meeting activity within the online social networking system.

8. The method claimed in claim 7, wherein non-meeting activity comprises exchanging messages with another individual member via the online social networking system, or posting news items within the online social networking system.

9. The method claimed in claim 1, wherein the online social networking system provides said creator with a deadline within which a threshold number of individual members must have joined said society and, if said threshold number of individual members have not joined said society by the deadline, then the online social networking system disbands said society.

10. The method claimed in claim 1, further comprising:
    storing associations between respective pairs of individual members; and
    periodically determining whether one of the pairs of individual members have engaged in a minimum threshold number of communications between them over a time period and, if not, then deleting the stored association between said one of the pairs of individual members.

11. A computer-implemented online social networking system, the system comprising:
    a computer-implemented structured database storing a plurality of individual member profile records, each individual member profile record including personal information and experience data input by that individual member, and each having an associated individual points record; and
    a computer server to having computer-executable instructions which, when executed, cause the computer server to:
    receive and store in a database structure a plurality of individual member profile records, each individual member profile record including personal information and experience data input by that individual member;
    receive, at the online social networking system, a society creation request associated with one of the individual members as a creator, and storing a society record defining the society;
    receive and store in the society record, at the online social networking system, from the creator, required entry criteria associated with the society, wherein said required entry criteria specify characteristics required for membership in the society, and wherein the required entry criteria are selected from personal information and experience data fields defined in the online social networking system;

receive a request for membership in said society at the online social networking system, the request being associated with a requesting individual member associated with one of the individual member profile records, and, in response, determine whether said one of the individual member profile records contains personal information and experience data that meets the required entry criteria associated with the society and,
if so, transmit an acceptance message to the requesting individual member and,
if not, transmit a refusal message to the requesting individual member, receive data regarding participation in a meeting from an individual connected with one of the individual member profile records, receive verification data confirming participation from another participant in the meeting, and credit the individual points records associated with the individual member profile record with one or more points.

12. The system claimed in claim 11, wherein the individual points record is credited with one or more points when the associated individual member exchanges messages with another individual member via the online social networking system.

13. The system claimed in claim 12, wherein said one or more points are further associated with the society if said individual member and said another individual member are both members of the society.

14. The system claimed in claim 11, wherein the society record further stores a minimum monthly point total required for continued membership in the society, and wherein the system is to determine, monthly, whether each member of the society has accumulated points associated with intra-society activity that meet or exceed the minimum monthly point total and, if not, then expelling such member from the society.

15. The system claimed in claim 14, wherein, prior to expelling such member, the system is to transmit a warning message providing said member with a minimum time in which to accumulate a specified number of points associated with intra-society activity to prevent expulsion.

16. The system claimed in claim 11, wherein the instruction further cause the computer server to:
store associations between respective pairs of individual members; and
periodically determine whether one of the pairs of individual members have engaged in a minimum threshold number of communications between them over a time period and, if not, then delete the stored association between said one of the pairs of individual members.

17. The method claimed in claim 1, wherein the meeting comprises one of a teleconference call, a videoconference call, and a face-to-face meeting.

18. The method claimed in claim 1, wherein the number of points credited to the individual points record is dependent upon a number of verified attendees at the meeting.

19. The system claimed in claim 11, wherein the meeting comprises one of a teleconference call, a videoconference call, and a face-to-face meeting.

20. The system claimed in claim 11, wherein the number of points credited to the individual points record is dependent upon a number of verified attendees at the meeting.

* * * * *